(12) United States Patent  
Burwell (10) Patent No.: US 8,091,728 B2
(45) Date of Patent: Jan. 10, 2012

(54) WET WELL APPARATUS WITH BASE FORM AND INSTALLATION METHOD REGARDING SAME

(75) Inventor: John Burwell, Eagan, MN (US)

(73) Assignee: Xerxes Corporation, Minneapolis, MN (US)

( * ) Notice: Subject to any disclaimer, the term of this patent is extended or adjusted under 35 U.S.C. 154(b) by 551 days.

(21) Appl. No.: 12/247,525

(22) Filed: Oct. 8, 2008

(65) Prior Publication Data

US 2010/0084409 A1    Apr. 8, 2010

(51) Int. Cl.
| | |
|---|---|
| *B65D 90/02* | (2006.01) |
| *B65D 6/28* | (2006.01) |
| *B65D 8/04* | (2006.01) |
| *B65D 6/40* | (2006.01) |
| *B65D 88/76* | (2006.01) |

(52) U.S. Cl. ............... 220/565; 220/567.1; 220/611; 220/612; 220/613; 220/616; 220/626; 220/661; 29/428; 52/169.7; 52/169.8

(58) Field of Classification Search .............. 220/565, 220/567.1, 611–613, 616–618, 626, 661; 29/428; 52/169.7, 169.8, 247–249
See application file for complete search history.

(56) References Cited

U.S. PATENT DOCUMENTS

| 833,288 A | * | 10/1906 | Anderson ............ 220/611 |
|---|---|---|---|
| 3,247,864 A | | 4/1966 | Conery |
| 3,375,788 A | | 4/1968 | Solas et al. |
| 3,505,769 A | * | 4/1970 | Summerfelt et al. ........... 52/249 |
| 3,642,134 A | | 2/1972 | Reckers |
| 3,917,104 A | * | 11/1975 | Rossitto et al. ............... 220/565 |
| 3,925,132 A | | 12/1975 | Bartlow et al. |
| 4,014,475 A | | 3/1977 | Grace et al. |
| 4,344,543 A | | 8/1982 | Hoffman |
| 4,594,153 A | | 6/1986 | Weis |
| 5,435,664 A | | 7/1995 | Pettersson |
| 5,562,254 A | | 10/1996 | Sleasman et al. |
| 5,645,231 A | | 7/1997 | Smith |
| 5,658,135 A | | 8/1997 | Sodergard |
| 5,752,315 A | | 5/1998 | Sleasman et al. |
| 5,806,702 A | | 9/1998 | Sabo |

(Continued)

FOREIGN PATENT DOCUMENTS

EP    0 611 269 A1    1/1994

(Continued)

OTHER PUBLICATIONS

Product Data Sheet. "TOP for Self-Cleaning Pump Stations." Retrieved from the Internet on Apr. 14, 2008 at http://www.flygtus.com/canada/effluent/online/top.htm. 1 page.

(Continued)

*Primary Examiner* — Anthony Stashick
*Assistant Examiner* — Madison L Wright
(74) *Attorney, Agent, or Firm* — Mueting Raasch & Gebhardt, P.A.

(57) ABSTRACT

A wet well apparatus, and installation method therefore, that includes a cylindrical body extending between a first end and a second end along a body axis defining an interior material holding volume and a base form closing the first end of the cylindrical body to define a base interior volume adjacent the interior material holding volume of the cylindrical body. The base form is configured to receive a flowable fill material in the base interior volume.

27 Claims, 6 Drawing Sheets

U.S. PATENT DOCUMENTS

| | | | |
|---|---|---|---|
| 5,816,510 | A | 10/1998 | Earle, III et al. |
| 6,059,208 | A | 5/2000 | Struthers |
| 6,164,315 | A | 12/2000 | Haslock et al. |
| 6,644,342 | B1 | 11/2003 | Bogan et al. |
| 6,770,206 | B2 | 8/2004 | Gasvoda |
| 2001/0037827 | A1 | 11/2001 | Haslock et al. |
| 2006/0260993 | A1 | 11/2006 | Daley et al. |
| 2008/0011372 | A1 | 1/2008 | Czarnota |

FOREIGN PATENT DOCUMENTS

| | | |
|---|---|---|
| EP | 0 611 269 B1 | 1/1994 |
| EP | 0 767 279 A1 | 9/1996 |
| WO | 2006/017448 A1 | 2/2006 |

OTHER PUBLICATIONS

Product Data Sheet. Jackel. "Sump Basins, Sewage Basins, Fiberglass Basins, Check Valves and Accessories for Superior Environmental Protection." 4 pages. © 1999-2006 Jacket, Inc.

Product Data Sheet and Specifications. LFM FRP Specialists. "LFM offers a full Customer Service Experience". Retrieved from the Internet on Sep. 30, 2008 at http://lfm-frp.com/categories/speciflcations/fiberglass-wetwell-liners.html. 4 pages.

Brochure. e one Sewer Systems. Engineered to Do One Job Perfectly. E/One Extreme Series. Pressure Sewer Systems. 6 pages.

Brochure. e one Sewer Systems. Anywhyere You Set Your Sites E/One Sewer Systems Will Set You Free.10 pages.

Brochure. Hydro-Action Industries. NSF International Standard 40 Certified Aerobic OnSite Wastewater Treatment. 4 pages. Publication Date Unknown.

Product Data Sheet/Brochure. Smith & Loveless Inc. "Wet Well Mounted Pump Stations". 2 pages.

Brochure. © 2007 Franklin Electric Co., Inc. "The V3-IGP Power Sewer®". 6 pages.

Advertisement in Water Online Magazine (www.wateronline.com). 2008 Edition. The Optimum Pump Station from ITT Water & Wastewater. 3 pages including cover.

Fiberglass Basins, Covers & Accessories—AK Industries, Inc. 2003. General Policies, Fiberglass Specifications & Warranty Information. Cover page, Table of Contents, and pp. 49-60.

Poly Sump & Sewage Basins. A.K. Industries, Inc. 2008. Catalog of Products. 20 pages.

Xerxes® Underground Wet Wells. Fiberglass pump vaults and lift stations—watertight and rustproof. Product Data/Specifications Brochure. 4 pages. Feb. 1, 2007.

Xerxes® Underground Wet Wells. Fiberglass pump vaults and lift stations—watertight and rustproof. Product Data/Specifications Brochure. 4 pages. Feb. 1, 2007.

Containment Solutions—A Denali Company. "Flowtite® Fiberglass Wetwells—The Very Best You Can Put in the Ground". Brochure. 2000. 8 pages.

Containment Solutions. "New Product Update" Fiberglass Manhole Adhesive Joint with Concrete Base © 2007 (1 pg); Fiberglass Wetwell Installation Instructions © 2005 (11 pgs); Glass-Fiber Reinforced Polyester (FRP) Wetwells Specifications © 2001 (7 pgs); Flowtite Wetwell Short Form Specification © 2002 (3 pgs).

\* cited by examiner

WET WELL APPARATUS WITH BASE FORM AND INSTALLATION METHOD REGARDING SAME

BACKGROUND

The present invention relates generally to wet wells for the containment of materials, such as water and/or other compositions therein, e.g., underground wet wells for water or waste.

Figure 1:
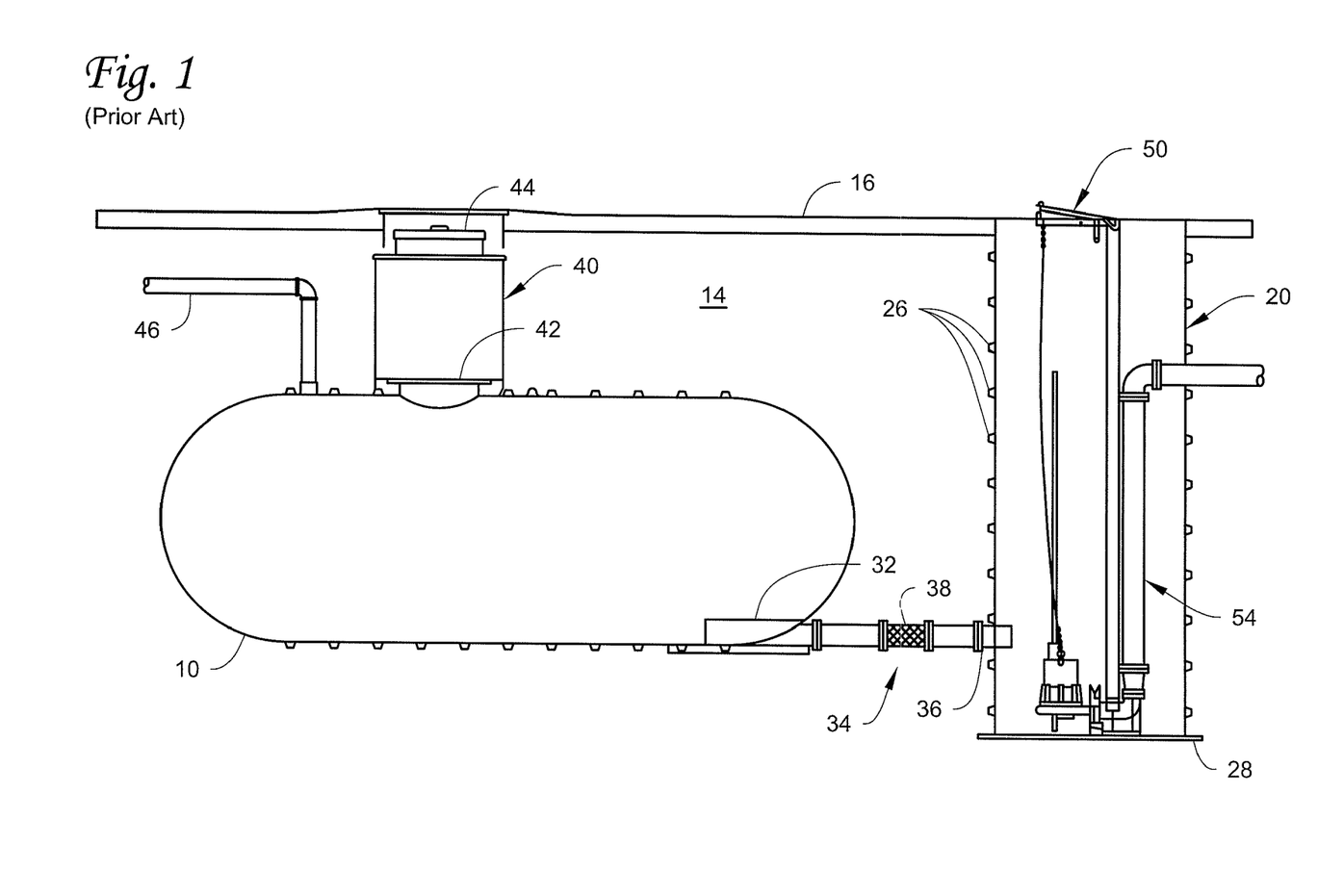
FIG. 1 is an illustration of a conventional wastewater system using a conventional wet well.

Various configurations of wet wells are available and have been used in a variety of applications. For example, as shown in FIG. 1, fiberglass wet wells available from Xerxes Corp. (Minneapolis, Minn.) may be used in wastewater applications. Such applications may include the use of an underground fiberglass wastewater tank 10, fluidly coupled to an underground wet well 20 by one or more different components 34. For example, such connection components 34 may include a nozzle 32 associated with the tank 10, a connector 38, and a nozzle 36 associated with the wet well 20. Further, as shown in FIG. 1, access to the tank 10 is provided via sump 40, manway 42, and cover 44. A vent 46 is also provided for the tank 10. Access to the interior of the wet well 20 is provided at ground surface via a cover structure 50 and a pump and conduit assembly 54 is configured for moving compositions out of the wet well 20. Such compositions (e.g., water, wastewater, etc.) generally are provided into the wet well 20 from the tank 10.

Yet further, the wet well 20 includes an anti-flotation flange 28. The anti-flotation flange 28 is a full or partial disk that surrounds the base, and extends a few inches out from the base, beyond the normal "diameter" of ribs 26. When properly buried, the flange 28 engages the surrounding burial material, and resists the tendency of the wet well 20 to "lift" or "float" under the influence of water, where the water-table or other conditions are such that the hole in which the wet well 20 is buried becomes filled or partially filled with water.

Wet wells are typically sunk vertically, or in a vertical alignment, into the ground 14, and are used to contain water, or other liquids (e.g., waste). For example, the top of the wet well 20 may be installed level with a black top material 16. Wet wells may, for example, be used in waste water facilities (e.g., such as shown in FIG. 1), in fire suppression systems, and/or in other fluid or water recovery systems (e.g., lift station and pump vault applications). A conventional wet well may be made in a variety of diameters and depths, and may be prepared in sections.

Early wet wells were prepared of wood and/or concrete materials. These materials, which typically have to be erected in situ, may present a variety of problems, most particularly involving leakage. Wet wells were subsequently prepared using steel, or steel and concrete. Steel, however, presented problems associated with corrosion. Given the nature of the contained liquids held in wet wells and other storage tanks (e.g., which include industrial wastes, organic wastes or sewage, and/or other various compositions), corrosion and subsequent leakage in such configurations present significant problems.

In comparison, fiberglass reinforced plastic (FRP) is relatively light, can be prepared at the plant and shipped to the site, and is corrosion resistant. It is similarly unlikely to develop leaks. As such, wet wells (e.g., underground wet wells) have been made using FRP to provide watertight and rustproof construction. For example, a FRP wet well may be made on a male mold or mandrel, and once cured, at least preliminarily, removed from the mandrel. The process of manufacturing on a mandrel of this type is typically referred to as a "spray up" process, where fibers and plastic resin are applied over a release agent to the mandrel, which lends the wet well its shape.

To provide a FRP wet well, such as wet well 20 shown in FIG. 1, with sufficient stiffness and strength to resist applied forces, and to resist deformation or buckling, ribs 26 as shown in FIG. 1 are used. Such ribs 26 provide the molded product with hoop strength.

In a male molding process, the ribs 26 are provided by attaching a form to the molded wet well, and then laying fiber up and across the form, providing the connection between the rib and the well in the form of a secondary attachment. Processes for the manufacture of wet wells of this type are not substantially different from the processes of manufacturing underground storage tanks through the same method, such as those shown in U.S. Pat. No. 3,925,132, incorporated herein by reference.

FRP wet wells have also been prepared from plastic resin and chopped fiber that is sprayed onto the interior of a female mold. The resin is preferably applied with a catalyst, as it is sprayed together with the chopped fiber, to create a strong, relatively stiff, water impermeable and corrosion resistant wall. The mold itself includes ribs where necessary, so that they become part of the integral structure. Information on the method of comminuting the glass fibers, as well as application of the fibers and resin to the interior of the female mold, is set forth in U.S. Pat. No. 5,645,231, incorporated herein by reference. After preliminary curing, the female mold halves separate along a longitudinal axis and a full cure commences of the resin impregnating the fibrous body.

Typically in a wet well, pumps and the associated lines and valves are disposed either in the bottom of the wet well itself, or adjacent to the wet well in a separate installation. Particularly, where the pump and associated piping are to be disposed on the bottom of the wet well itself, it is necessary to provide a bottom structure that exhibits very small deflections when forces are applied thereto (e.g., upward forces on the bottom of the wet well, such as a result of water thereunder). Resistance to deflection is important even when no fluid is present in the wet well itself, such as in a situation where water surrounds the outside of the wet well (e.g., in a high-water table environment). Very limited deflection is tolerated, and excessive movement of the bottom in response to applied pressure could disrupt or break the pumps, piping and/or pumping controls, leading to pumping failure and/or leakage.

Various techniques have been used to install wet wells to provide resistance to such deflection. For example, wet wells have been installed on poured concrete structures (e.g., having a planar top surface) to prevent deflection. In other words, concrete structures, made thick enough, have been used in an attempt to provide resistance to applied forces and prevent significant deflection to the bottom of the wet well. However, the presence of cracks, or pores in the concrete, introduce leakage issues and allow fluid access to the bottom of the wet well. As such, concrete structures are not always successful to prevent deflection of the bottom of the wet well.

In other words, water can get between the concrete pad and the bottom of the wet well presenting the same applied pressure and deflection issues as if there were no concrete base provided. While one can resist the tendency of the bottom of the wet well to "float" off the base, by bolting the floor or the wet well to the concrete, the bolt holes provide leakage spots and the bolts represent points of corrosion, creating a variety of issues involving sealants. Further, others have attempted to connect the wet well bottom to the concrete slab using external anchors (e.g., extending from the bottom of the wet well) encompassed by the concrete of the pad when formed.

The concrete or the bottom of the wet well could be coated to provide a seal between the concrete and the wet well bottom in an attempt to resist leakage and fluid from reaching the bottom of the wet well. However, the applied pressures or force may frequently pop off or crack such coatings. Further, attempting to adhere the concrete base to the bottom of the wet well is both time consuming and expensive, and presents the prospect of introducing other poisons or toxins into the environment. In particular, it has proven difficult to provide a complete and lasting seal, between the concrete and the side walls, or bottom, of the wet well.

Still further, the thickness of the FRP bottom can be increased to prevent deflection thereof. For example, FRP laminates have become a preferred material because they combine significant stiffness and strength, and reduce or eliminate leakage, while also reducing the problem of corrosion. However, as the diameter of required wet wells increase, the amount of material necessary to provide FRP wet wells with sufficiently stiff bottoms that can support pumping apparatus and the like also increases, making such a solution cost prohibitive.

SUMMARY

One or more embodiments of the present invention provide wet wells (e.g., FRP wet wells), of variable diameter and height, that are resistant to applied forces, are corrosion resistant, and/or are resistant to leakage. Further, one or more embodiments of the present invention provide wet wells in an environment where the bottom of the wet well is substantially flat to support pumping apparatus, piping, controls and the like, without significant deflection, and/or without issues associated with leakage or corrosion.

One embodiment of a wet well apparatus according to the present invention includes a cylindrical body (e.g., of fiberglass reinforced plastic) extending between a first end and a second end along a body axis defining an interior material holding volume (i.e., wherein the cylindrical body at the first end thereof lies a first distance from the body axis). The wet well apparatus further includes a base form (e.g., an FRP base form) closing the first end of the cylindrical body to define a base interior volume adjacent the interior material holding volume of the cylindrical body. In one embodiment, the based form is configured to receive a flowable fill material (e.g., concrete) in the base interior volume and includes a base bottom (e.g., a base bottom that occupies an area greater than the cross-section area of the first end of the cylindrical body taken orthogonal to the body axis) and one or more base side walls extending from the base bottom (e.g., wherein at least one or more portions of the one or more base side walls of the base form are located a distance farther from the body axis than the first distance).

In one embodiment of the wet well apparatus, the base bottom may be planar. Further, the base form may include one or more upper surface portions extending inward toward the cylindrical body from the one or more base side walls.

In another embodiment, the one or more base side walls may be orthogonal to the base bottom. Further, for example, the one or more upper surface portions extending inward toward the cylindrical body from the one or more base side walls may be parallel to the base bottom.

Further, in another embodiment, the base form may include reinforcement material (e.g., rebar) positioned in the interior of the base form, one or more layers of material (e.g., fiberglass reinforced plastic) located at the first end of the cylindrical body between the base interior volume and the interior material holding volume of the cylindrical body, and/or one or more fill openings defined in the one or more layers of material located at the first end of the cylindrical body. In one or more embodiments, the fill openings are all defined in the one or more layers of material (e.g., fiberglass reinforced plastic) located at the first end of the cylindrical body between the base interior volume and the interior material holding volume of the cylindrical body.

In another embodiment, the base form forms a fluid-tight connection with the cylindrical body. Further, in still another embodiment, the base form may be filled with a flowable fill material (e.g., concrete, such as cement or polymer concrete).

In yet another embodiment, the base form of the wet well apparatus may be filled with a flowable fill material resulting in an upper surface portion of the fill material adjacent the interior material holding volume of the cylindrical body. Further, the upper surface portion of the fill material may be covered with one or more layers of material (e.g., fiberglass reinforced plastic), wherein the one or more layers of material may be secured at the first end of the cylindrical body.

One exemplary embodiment of a method of installing a wet well apparatus in a hole includes positioning a wet well apparatus in the hole. The wet well apparatus may include a cylindrical body (e.g., formed of fiberglass reinforced plastic) extending between a first end and a second end along a body axis to define an interior material holding volume, and a base form closing the first end of the cylindrical body, wherein the base form defines a base interior volume adjacent the interior material holding volume defined by the cylindrical body. The method further includes providing a flowable fill material (e.g., concrete) within the base interior volume defined by the base form (e.g., while the wet well apparatus is in the hole or prior to positioning the wet well apparatus in the hole).

In one embodiment of the method, the cylindrical body of the wet well apparatus at the first end thereof is a first distance from the body axis, and the base form includes a base bottom and one or more base side walls extending from the base bottom. At least one or more portions of the one or more base side walls of the base form are located a distance farther from the body axis than the first distance.

Further, in one or more embodiments of the method, the wet well apparatus may include one or more layers of material (e.g., fiberglass reinforced plastic) located at the first end of the cylindrical body between the base interior volume and the interior material holding volume of the cylindrical body, and one or more fill openings defined in the one or more layers of material located at the first end of the cylindrical body. In such an embodiment, for example, providing the flowable fill material within the base interior volume defined by the base form may include providing flowable fill material within the base interior volume defined by the base form through one or more of the fill openings.

In one or more embodiments of the method, reinforcement material may be positioned in the base interior volume defined by the base form (e.g., prior to positioning the wet well apparatus in the hole or after positioning the wet well apparatus in the hole).

In still another embodiment of the method, providing flowable fill material within the base interior volume defined by the base form results in an upper surface portion of the fill material adjacent the interior material holding volume defined by the cylindrical body. In such an embodiment, the installation method may further include positioning one or more layers of material (e.g., fiberglass reinforced plastic) at the first end of the cylindrical body to cover the upper surface portion of the fill material.

Another exemplary embodiment of a wet well apparatus according to the present invention includes a cylindrical body of fiberglass reinforced plastic extending between a first end and a second end along a body axis defining an interior material holding volume and a base form of fiberglass reinforced plastic forming a fluid-tight connection with the cylindrical body and closing the first end of the cylindrical body to define a base interior volume adjacent the interior material holding volume of the cylindrical body. The base form is configured to receive a flowable fill material in the base interior volume. Further, the base form may include a base bottom (e.g., wherein the base bottom occupies an area greater than the cross-section area of the first end of the cylindrical body taken orthogonal to the body axis) and one or more base side walls extending from the base bottom. Generally, a cross-section area of at least a portion of the base form taken orthogonal to the body axis is greater than a cross-section area at the first end of the cylindrical body taken orthogonal to the body axis.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention. Unless stated otherwise herein, the figures of the drawing are rendered primarily for clarity and thus may not be drawn to scale.

As used herein, "a," "an," "the," "at least one," and "one or more" are used interchangeably. The term "and/or" (if used) means one or all of the listed elements or a combination of any two or more of the listed elements.

Figure 2A:
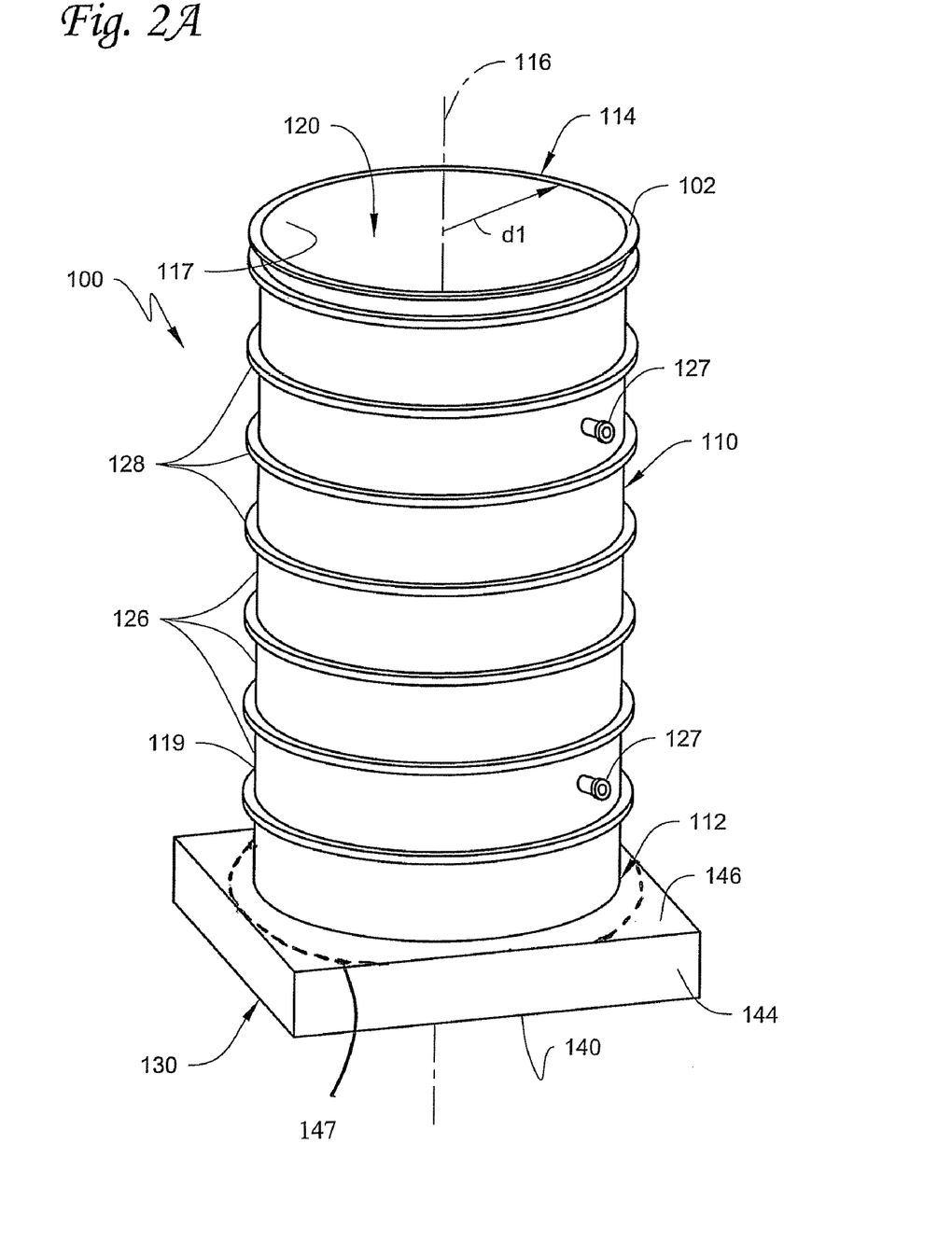
FIGS. 2A-2C show a perspective view, a top view, and a side view, respectively, of one exemplary embodiment of a wet well apparatus according to the present invention.
Figure 2B:
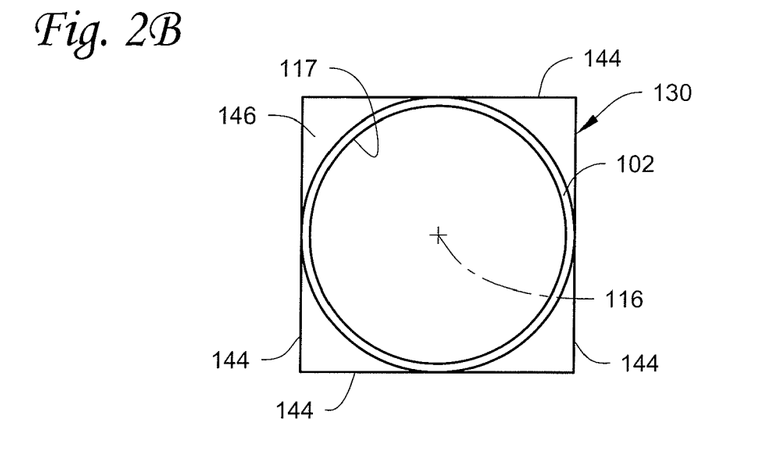
Figure 2C:
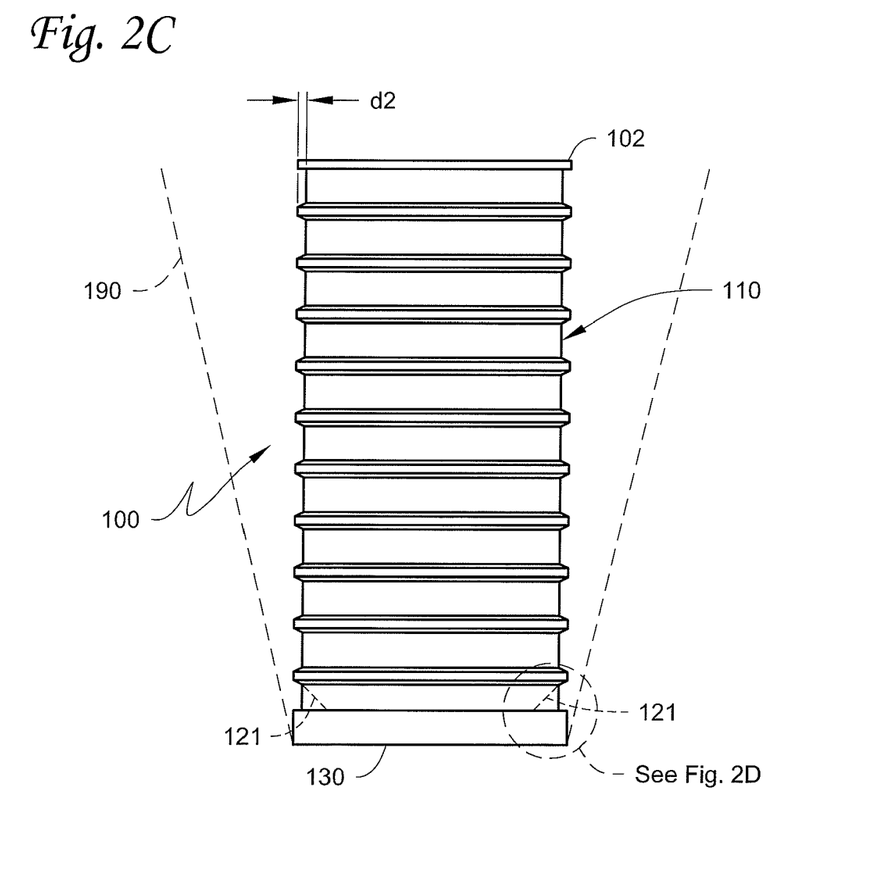
Figure 2D:
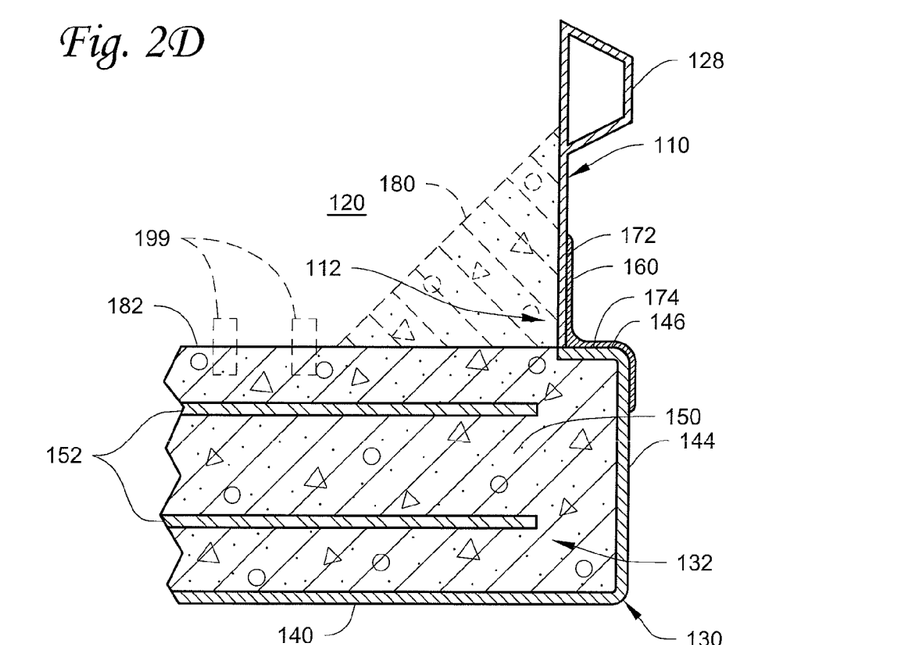
FIG. 2D shows an exemplary detail cross-section view of a portion of the wet well apparatus of FIGS. 2A-2C with a base form thereof filled with a flowable fill material, e.g., concrete, according to the present invention.

FIGS. 2A-2C show a perspective view, a top view, and a side view, respectively, of one exemplary embodiment of a wet well apparatus 100 according to the present invention. FIG. 2D shows an exemplary detail cross-section view of a portion of the wet well apparatus 100 of FIGS. 2A-2C with a base form 130 thereof filled with a flowable fill material 150, e.g., concrete, according to the present invention.

Wet well apparatus (e.g., a vertically positioned storage tank generally installed upright and having a height greater than its diameter) described herein, such as wet well apparatus 100, may be provided of fiberglass reinforced plastic (FRP). However, the wet well apparatus may be formed of other materials such as one or more metals (e.g., steel), one or more polymers (e.g., polyethylene, polyvinyl chloride, polypropylene, polyurethane, and the like), or any other suitable storage tank material.

In one or more embodiments, such wet well apparatus may be produced using either male or female molding techniques. However, any manufacturing methods may be used to provide a wet well apparatus having a base form in accordance with the present invention as would be known to one skilled in the art. The present invention is not limited to any particular manufacturing technique, although certain techniques may have benefits over others. For example, in one embodiment, the wet well apparatus provided herein may be female molded to provide integral ribs (e.g., ribs 128 of wet well apparatus 100), to enhance strength and resist detachment of ribs from walls of the wet well apparatus under application of compressive forces.

The wet well apparatus 100 generally includes a body (e.g., a FRP cylindrical body 110) extending along an axis 116 from a first end 112 to a second end 114 defining an interior material holding volume 120. The wet well apparatus 100 is provided with a base form 130 used to provide a wet well apparatus 100 with resistance to deflection, as required, for instance, when pumping or similar apparatus is provided in the wet well apparatus 100. For example, the base form 130 may be filled with a flowable fill material (e.g., such as concrete) to provide resistance to deflection.

The base form 130 and cylindrical body 110 of the wet well apparatus 100 may be manufactured as an integral unit or the components may be produced separately and assembled using suitable materials (e.g., fiberglass lapping materials) as known to one skilled in the art. The base form 130 and the cylindrical body 110 form a fluid-tight connection. This fluid-tight connection can be the result of the components being formed integrally, or connected in a fluid-tight manner (e.g., with fiberglass lapping materials and processes). Further, the base form 130 and cylindrical body 110 of the wet well apparatus may be installed (e.g., in a hole) as a single unit (e.g., already assembled at the manufacturer), or constructed on site (e.g., below or above grade) after the components are shipped to the installation site.

In one embodiment, a FRP wet well apparatus 100 of the present invention may be prepared from female-molded plastic resin and chopped fiber, that is sprayed onto the interior of a female mold. The resin may be applied with a catalyst, as it is sprayed together with the chopped fiber, to create a strong, relatively stiff, water impermeable wall.

For example, the mold itself may include structure for forming ribs 128 (e.g., circumferential ribs) between wall portions 126 (e.g., circumferential smooth portions) where necessary, so that they become part of an integral wet well structure. Information on the method of comminuting the glass fibers, as well as application of the fibers and resin to the interior of the female mold, is set forth in U.S. Pat. No. 5,645,231, incorporated herein by reference. After preliminary curing, the female mold halves separate along a longitudinal axis and a full cure commences of the resin impregnating the fibrous body. The result is a cylinder body 110 of the type generally shown in FIG. 2. Such a cylindrical body need not have smooth interior and exterior surfaces, but rather may have features associated therewith, such as the ribs 128, flanges at one or more locations, etc.

Although various configurations are possible for the cylindrical body, the cylindrical body 110 of the wet well apparatus 100 shown in FIGS. 2A-2D generally includes smooth wall portions 126 and ribs 128. The cylindrical body 110 shown in FIGS. 2A-2D lies at a first distance d1 from the body axis 116. In other words, the inner surface 117 of the cylindrical body 110 having a circular cross-section orthogonal to body axis 116 has a radius d1. In this embodiment, the first end 112 also lies a first distance d1 from the body axis. The ribs 128 of the cylindrical body 110 extend a predetermined distance d2 farther away from the body axis 116 than the exterior surface 119 of the wall portions 126 as shown in FIG. 2C.

The ribs 128 of the wet well apparatus 110 may be formed in various manners. For example, in a male-molded wet well apparatus, the ribs may be attached to the outer surface of the cylindrical body. Female molded FRP wet well apparatus may be produced in the same fashion as female molded underground storage tanks (e.g., such as that shown in FIG. 1). These wet well apparatus feature a monocock or unitary construction where the ribs are integral with the tank. Because, in a female mold process, the ribs are "molded in" to the well form, in either a closed or open design, accurate placement of the ribs is premised on the mold, and can be designed to mold tolerances.

In other words, wet well apparatus 100 is provided with circumferential ribs 128. In one embodiment, such ribs 128 assist the filled base form 130 described herein in holding down the tank when installed within a hole. As discussed, if a female molding process is employed as described herein, ribs 128 are integral with the cylindrical wall portions of the cylindrical body 110. Ribs 128 may be either "open" (not shown), that is, they follow the contour of the rib form itself, or they may be "closed", providing a layer of FRP over the base of the rib and a smooth interior cylinder as is shown in FIG. 2D.

Unlike most male molded processes, the rib attachment point is eliminated when using a female molding process. In all but the smallest of diameters, female molding substantially reduces waste in manufacturing. A typical female molding process, as applied to underground storage tanks, is set forth in U.S. Pat. No. 5,720,404, incorporated herein by reference. While this reference focuses on a double-walled storage tank, the wet well apparatus of the present invention can be double-walled or single-walled, depending on application and applicable regulation.

Although the cylindrical body 110 is shown as a cylinder having the same diameter along its entire height, one will recognize that the diameter may change along the height. For example, the diameter may become smaller at the first end 112 to form a truncated partial dome-shaped end 121 terminating adjacent the based form 130 as shown by the optional dashed line configuration in FIG. 2C. In other words, the cylindrical body 110 of the wet well apparatus 100 could be configured like a truncated underground storage tank (e.g., a portion of a storage tank with the dome-shaped end cut off).

The cylindrical body 110 of the wet well apparatus 100 is terminated at the second end 114 by flange 102. For example, flange 102 may be used to support a FRP top, a steel top provided with fixtures, a concrete block top, or communicate with a more complicated street box or other access structure. Further, for example, in one or more embodiments, the second end 114 provides access to the interior material holding volume 120 (e.g., which may allow concrete to be filled into the base interior volume 132 (e.g., see FIG. 2D) defined by the base form 130). Yet further, the second end 114 may be a closed end. Further, generally, for example, the second end 114 may be at or above the surface of the hole (e.g., hole 190 as shown in FIG. 2C) in which the wet well apparatus 100 is installed.

As described herein, the presence of water presents particular concerns with respect to deflection of the walls of the installed wet well apparatus. The walls of the wet well apparatus are typically featureless, other than access ways (e.g., ladders in deep wells, piping access, and the like) alarms and similar appurtenances. For example, such piping access is indicated generally by nozzles 127 in FIG. 2A. It is frequently the case that one or more pumps, pump-associated piping, control modules, level monitors and the like are associated with the bottom of the tank. To this end, significant deflection of the bottom is to be avoided to ensure that the pump and related apparatus is not damaged, or its operation interrupted.

A stable base with minimal deflection is accomplished according to the present invention with use of base form 130 which closes the first end 112 of the cylindrical body 110 of the wet well apparatus 100 (e.g., in a fluid-tight manner) and defines a base interior volume 132 adjacent the interior material holding volume 120 of the cylindrical body 110. As illustrated in FIGS. 2A-2D, the cylindrical body 110 terminates in the base form 130 that can be filled with a flowable material 150 (e.g., concrete as shown in FIG. 2D). As used in this context, the term "adjacent" does not only necessarily refer to the volumes being directly adjacent (e.g., such that air in one is in contact with air in the other), but may refer to the volumes being separated by one or more layers of material, such as in the wet well apparatus shown in FIG. 4.

The base form 130 is configured to receive a flowable fill material 150 (e.g., concrete) in the base interior volume 132 and includes a base bottom 140 and one or more base side walls 144 extending from the base bottom 140. In one or more embodiments, at least one or more portions of the base side walls 144 of the base form 130 are located a distance farther from the body axis 116 than the first end of the cylindrical body 110 (e.g., farther than first distance d1). In at least one embodiment all the side walls are located a distance farther from the body axis 116 than the first end of the cylindrical body 110 (e.g., the square type base form shown in FIG. 2).

In one embodiment of the wet well apparatus 100, the base bottom 140 may be planar and occupy an area greater than the cross-section of the cylindrical body 110 at the first end 112 thereof orthogonal to the body axis 116. Further, the base form 130 may include one or more upper surface portions 146 extending inward toward the cylindrical body 110 from the one or more base side walls 144.

As shown in FIG. 2A, the base form 130 takes the form of a box (e.g., the cross-section of the base form 130 orthogonal to the body axis 116 is a square) with four base side walls 144 being orthogonal to the base bottom 140. Each of the four base side walls 144 is located at a distance farther from the body axis 116 than the first end 114 of the cylindrical body. Further, the upper surface portion(s) 146 extending inward toward the cylindrical body 110 from the four base side walls 144 are generally parallel to the base bottom 140. As shown in FIG. 2D, the distance from the side walls 144 to the body axis 116 is at least as great as the distance from the body axis 116 to the farthest portion of the rib 128.

However, the base form 130 may be configured in various manners. For example, the base form may take the form of a cylinder. For example, the cross-section taken orthogonal to the body axis 116 may take the form of a circle with the base bottom being a circle (see, for example, the optional dashed line cylindrical configuration 147 in FIG. 2A). Further, for example, the base form may be any rectangular shape (e.g., a square), or have a cross-section having any polygonal shape (e.g., multi-sided). Further, for example, the base form 130 may take the form of a truncated cone with the smaller diameter of the truncated cone being adjacent the first end 112. Yet further, for example, the base form 130 may take the faun of a truncated sphere portion (e.g., a truncated dome structure), with the smaller diameter of the truncated sphere being adjacent the first end 112. The present invention is not limited to the particular shape of base forms described herein. However, certain base forms may be more advantageous than others. For example, a square box type base form may have certain shipping advantages.

Further, for example, the side walls 144 as shown in FIG. 2 extend orthogonal from the planar base bottom 140 at the edges thereof. However, such side walls 144 may extend from other portions of the base bottom 140. For example, the side walls may extend orthogonally (e.g., parallel to body axis) at a location inward from such edges leaving an additional flange at the edge. Various locations of the side walls may be suitable.

Yet further, for example, the side walls 144 do not need to extend orthogonally from the planar base bottom 140. However, the sides walls 144 may extend at different angles relative to the planar base bottom 140. For example, the side walls may extend at an angle back to the cylindrical body 110 forming a tapered box. Various angles for the side walls may be suitable.

As shown in FIG. 2D, the base form 130 may include reinforcement material 152 (e.g., rebar) positioned in the base interior volume 132 of the base form 130. Fill material 150 (e.g., concrete) is flowed into the base form 130 to provide a non-deflecting bottom 140. The fill material may be any suitable material that provides adequate non-deflecting properties. Generally, the fill material is a flowable fill material that is able to flow into various spaces of the base form 130 (e.g., flow into corners of a box type base form with or without assistance). The present invention is, however, not limited to the use of a particular type of flowable fill material 150. For example, various materials such as concrete, e.g., polymer concrete, cement, etc., and flowable materials like concrete may be used. In one or more embodiments, the flowable fill material 150 may be provided in the base form 130 at the factory or may be provided in the base form 130 when the wet well apparatus 100 is above or below grade at the site of installation.

Also, as shown in FIG. 2D, at least in one embodiment, the base form 130 is secured to the cylindrical body 110 by fiberglass lay-up materials (e.g., resulting in overlay 160) adhering to an exterior surface 172 at the first end 112 of the cylindrical body 110 and an exterior surface 174 of the base form 130 adjacent to the first end 112 of the cylindrical body 110 (e.g., an exterior surface 174 of the upper surface portion 146).

Yet further, as shown in FIG. 2D, the flowable fill material may be shaped at the first end 112 of the cylindrical body 110. For example, the flowable fill material may be applied to form an optional taper 180 from cylindrical body 110 to an upper planar surface 182 of the fill material 150. For example, a 45 degree angle may be formed to prevent material in interior material holding volume 120 from gathering in the corners of the wet well apparatus 100.

Various mounting apparatus 199 (see, e.g., FIG. 2D) may be provided (e.g., mounted, embedded, etc.) at the bottom of the wet well apparatus 100. For example, such mounting apparatus 199 may be fasteners, stud bolts, plates, anchors, openings for mounting items, or any other mounting apparatus used to mount items in the wet well apparatus 100. For example, such mounting apparatus may be used to mount controls, pumps, piping, plumbing, or any other apparatus that is used within a wet well. For example, such mounting apparatus 199, may be embedded (e.g., fully or partly) in the flowable fill material when it is provided in the base form 130 (e.g., at the factory or on site). For example, a stainless steel plate with stud bolts may be partly embedded for use in mounting a pump. Still further, for example, such mounting apparatus 199 may be provided as part of or mounted to the layers of material provided at the first end of the 112 of the wet well apparatus 100 between the interior material holding volume 120 and base interior volume 132. For example, although not shown, such mounting apparatus 199 may be provided as part of layers of material 186 described with reference to FIG. 3, or may be provided as part of upper surface portions 246 described with reference to FIG. 4C.

Figure 3:
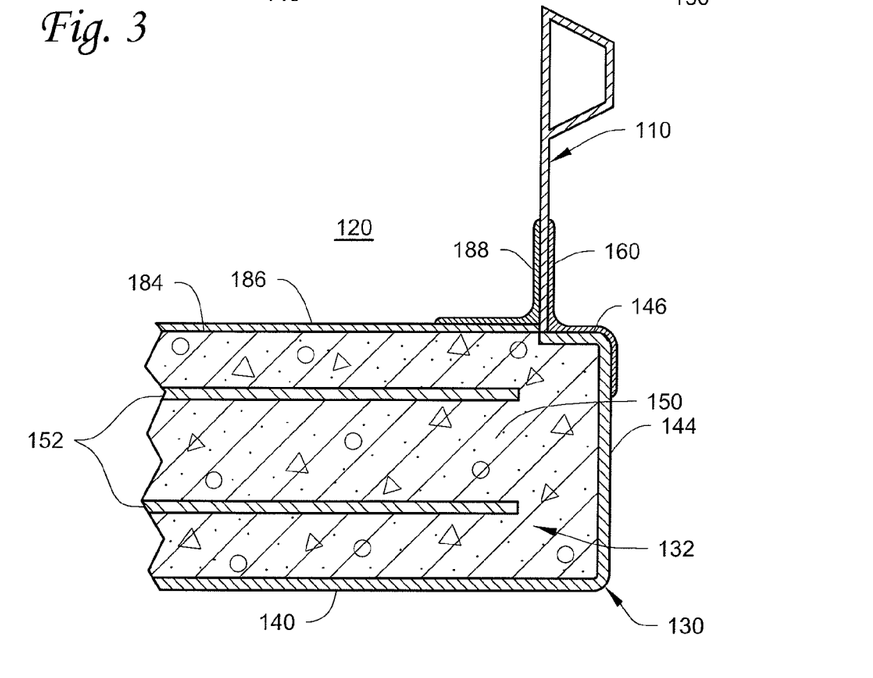
FIG. 3 shows an alternate exemplary detail cross-section view of a portion of the wet well apparatus of FIGS. 2A-2C with a base form thereof filled with a flowable fill material, e.g., concrete, according to the present invention (e.g., the concrete being covered with one or more layers of FRP).

FIG. 3 shows an alternate exemplary detail cross-section view of a portion of the wet well apparatus of FIGS. 2A-2C with the base form 130 thereof filled with a flowable fill material 150, e.g., concrete, according to the present invention. As shown therein, the base form 130 of the wet well apparatus 100 may be filled with the flowable fill material 150 resulting in an upper surface portion 184 of the fill material 150 adjacent the interior material holding volume 120 defined by the cylindrical body 110. The upper surface portion 184 of the fill material 150 may be covered with one or more layers of material 186 (e.g., one or more FRP layers). For example, at least in one embodiment, the one or more layers of material 186 may be secured to the interior surface 117 at the first end 112 of the cylindrical body 110 by fiberglass lay-up materials 188.

Figure 4A:
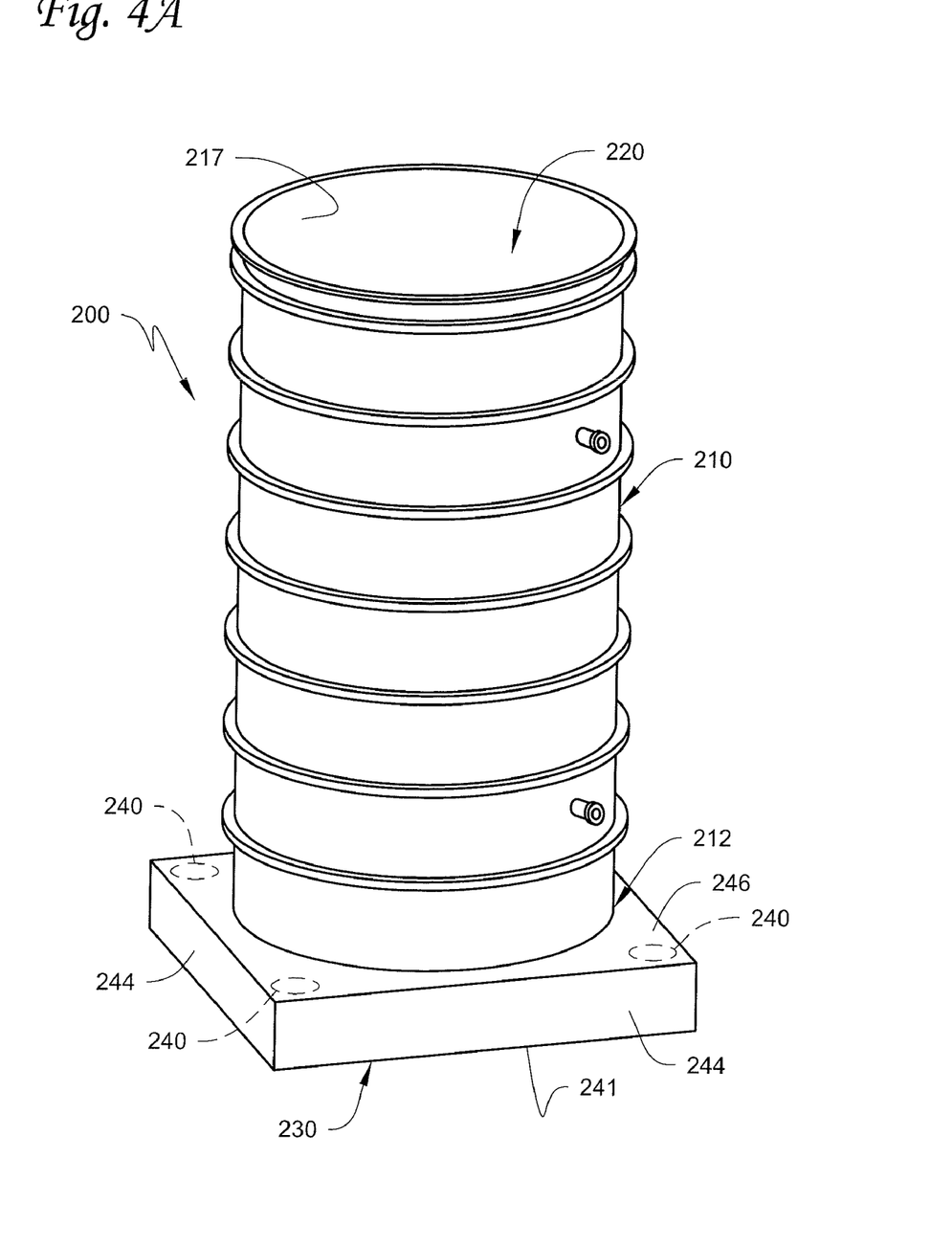
FIGS. 4A-4B show a perspective view and a top view, respectively, of another exemplary embodiment of wet well apparatus according to the present invention (e.g., where a base form thereof may be filled with concrete through one or more fill openings).
Figures 4B, 4C:
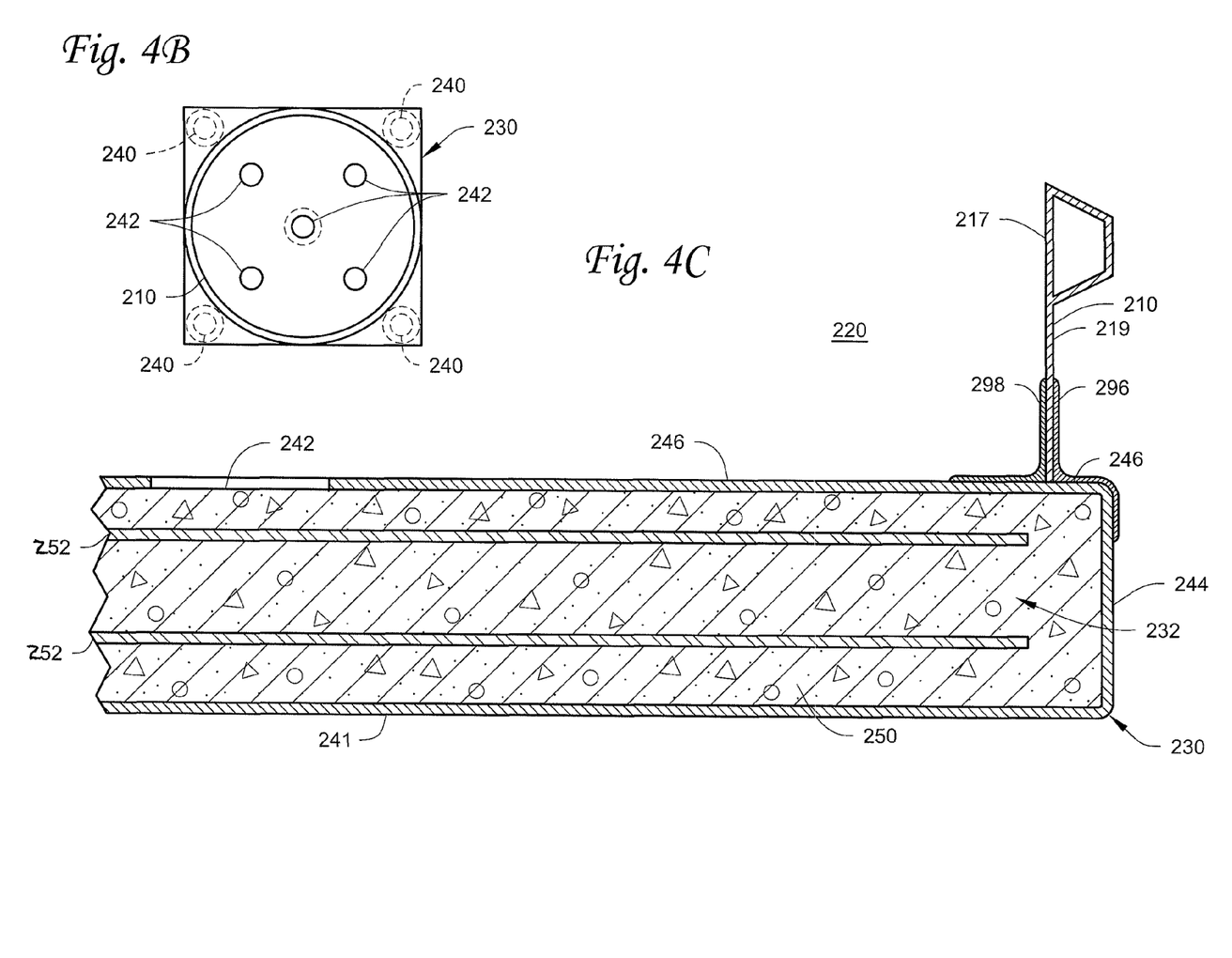
FIG. 4C shows an exemplary detail cross-section view of a portion of the wet well apparatus of FIGS. 4A-4B with a base form thereof filled with a flowable fill material, e.g., concrete, according to the present invention.

FIGS. 4A-4B show a perspective view and a top view, respectively, of another exemplary embodiment of a wet well apparatus 200 according to the present invention. The wet well apparatus 200 is substantially similar to the wet well apparatus 100, except that wet well apparatus 200 includes a base form 230 that can be filled with flowable fill material (e.g., concrete) through one or more fill openings (e.g., fill openings 240, 242). FIG. 4C shows an exemplary detail cross-section view of a portion of the wet well apparatus 200 of FIGS. 4A-4B with the base form 230 thereof filled with a flowable fill material 250, e.g., concrete.

As shown in FIGS. 4A-4C, base faun 230 closes the first end 212 of the cylindrical body 210 of the wet well apparatus 200 and defines a base interior volume 232 adjacent the interior material holding volume 220 defined by the cylindrical body 210. The base form 230 is configured to receive a flowable fill material 250 (e.g., concrete) in the base interior volume 232 and includes a base bottom 241 and one or more base side walls 244 extending from the base bottom 241. Further, the base faun 230 includes one or more upper surface portions 246 (e.g., such surface portions extending inward toward the cylindrical body 210 from the one or more base side walls 244). One or more fill openings 240, 242 may be defined in the one or more upper surface portions 246 of the base form 230.

In one or more embodiments, such as shown in FIG. 4C, a single upper surface 246 is formed integrally with the side walls 244 of the base form 230. As such, the base form 230 forms a closed box with only the fill openings 240, 242 providing access to the base interior volume 232. In this manner, the base form 230 can be secured to an interior surface 217 at the first end 212 of the cylindrical body 210 between the base interior volume 232 and the interior material holding volume 220 defined by the cylindrical body 210. For example, the upper surface portion 246 may be secured to the interior surface 217 at the first end 212 of the cylindrical body 210 by fiberglass lay-up materials to form an overlay 298. Likewise, the upper surface portion 246 may be secured to the exterior surface 219 at the first end 212 of the cylindrical body 210 by fiberglass lay-up materials to form an overlay 296.

Further, the base form 230 may include reinforcement material 252 (e.g., rebar) positioned in the interior volume 232 of the base form 230. For example, such reinforcement material may be positioned in the base form 230 prior to enclosing the volume defined thereby.

In the alternative, rather than a single surface portion 246 being formed integrally with the side walls 244, a construction similar to that described with reference to FIG. 3 may be used. For example, one or more layers (e.g., a formed FRP disc or FRP circular element) may be secured to an interior surface 217 at the first end 212 of the cylindrical body 210 between the base interior volume 232 and the interior material holding volume 220 defined by the cylindrical body 210.

In other words, wet well apparatus 200 may be similar to the apparatus shown in FIG. 3. However, in FIG. 3, the layer(s) 186 are secured after the fill material 150 is flowed into the base form 130. Contrary to FIG. 3, the wet well apparatus 200 provides an upper surface portion 246 within the interior of the cylindrical body 210 prior to flowing fill material 250 into base interior volume 232. With the upper surface portion 246 within the interior of the cylindrical body 210, the fill material 250 can be provided through one or more of fill openings 240, 242.

One skilled in the art will recognize that the fill openings 240, 242 may be formed in any suitable location that provides access to the base interior volume 232 defined by base form 230. However, it is beneficial to have all the defined fill openings only accessible within the interior of the cylindrical body 210 of the wet well apparatus 200 such as shown by fill openings 242, as opposed to those outside of the cylindrical body 210. In such a manner, for example, in one or more embodiments, if all the fill openings 242 are in the interior, the cylindrical body 210 acts as a shield to protect workers in the hole (e.g., when the base form 230 is filled with flowable file material 250 during on-site installation below grade). Further, for example, the openings 242 do not need to be sealed if in the interior as they are within a sealed and fluid-tight container (e.g., the base form and cylindrical body are formed in a fluid-tight connection). Fill openings 240 are shown in dashed form as they would typically not be used due to the advantages of using only interior fill openings 242.

One or more exemplary installation methods shall be briefly described with reference to the FIGS. 2-4. In one or more embodiments, base form 130 may be made separately from cylindrical body 110. The two parts may then be secured together using fiberglass lay-up materials (e.g., such as shown in FIG. 2D) and according to standard lay-up processing. In one or more other embodiments, base form 130 may be provided separately from the cylindrical body 110, and situated at the bottom of the opening or hole 190 in the ground for the wet well apparatus 100. The lay-up work may be done in the hole if the opening is of sufficient diameter to permit work therein. However, the wet well apparatus 100 to be installed may be provided in any suitable manner.

With a hole 190 provided in which the wet well apparatus 100 is to be installed, the wet well apparatus 100 is set or positioned into the hole 190. The installation method then includes providing a flowable fill material 150 (e.g., concrete) within the base interior volume 132 defined by the base form 130 while the wet well apparatus 100 is in the hole 190. The cylindrical body 110, or the walls thereof, at least in one embodiment, act as a shield to protect workers in the hole (e.g., when the base form 130 is filled with flowable file material 150 during on-site installation below grade, when additional apparatus is installed, etc.). In other words, for example, the present invention may eliminate the need for additional shield apparatus typically necessary during installation of a tank in a hole 190. However, the fill material may be provided into the base form 130 at the factory or above grade on-site, and then the filled wet well apparatus moved into the hole at the installation site.

As shown in FIG. 2D, the box-like base form 130 may be filled to the level of the first end 112 with concrete 150. However, in one or more embodiments, it may be filled further up the cylindrical body 110. The concrete may be optionally reinforced with rebar 152 or other reinforcing materials. Given the fluid-tight containment provided by the combination of cylindrical body 110 and the base form 130, the concrete 150 may be left open, without providing a danger of pores or leakage.

In an alternate embodiment, it may be desirable to provide an FRP floor on top of the concrete 150 such as illustrated in FIG. 3, for instance, to avoid filling and cracking of the concrete, or attack of the concrete by the materials to be held in the wet well apparatus 100. For example, as illustrated in FIG. 3, a round section or disk of one or more FRP layers 186 is prepared to the desired dimension and lowered into the interior of the well apparatus 100. Once atop the upper surface 184 of the concrete 150, the one or more FRP layers 186 (e.g., a single piece, impermeable FRP element) may be sealed to the cylindrical body 110 on the interior thereof, such as with use of conventional lay-up processes. This generally creates overlay 188, roughly opposite the exterior overlay 160. For example, at least in one embodiment, the overlays 188 and 160 combine to seal the concrete filled base form to the exterior and interior of the cylindrical body 110.

Alternatively, a prepared wet well apparatus 200 can be provided according to the embodiment illustrated in FIG. 4A-4C. The base form 230 may be a continuous single piece construction exhibiting a top 246 that is integral and continuous with sides 244 and the base bottom 240 of the base form.

The base form 230 may be secured to the cylindrical body 210 by overlay 296 (i.e., exterior) and/or overlay 298 (i.e., interior). As shown in the embodiment described with reference to FIG. 4, rebar 252 or other reinforcement material is "pre-positioned" within the base interior volume 232, for instance, by the simple expedient of using a frame that distances the rebar an adequate amount from top and bottom of the base frame 230, or by any other suitable manner.

Preferably, only fill openings 242 (e.g., pour holes) in the interior of the cylindrical body 210 are provided for introduction of fill material 250 (e.g., concrete). For example, the concrete fills the base form 230 and cures therein. Thereafter, the fill openings 242 may be sealed (although not necessarily). For example, FRP lay-up materials may be used, a mesh layer may assist in the lay-up process, or any other suitable manner of sealing the openings may be performed.

The complete disclosure of the patents, patent documents, and publications cited in the Background, the Summary, the Detailed Description of Exemplary Embodiments, and elsewhere herein are incorporated by reference in their entirety as if each were individually incorporated. Exemplary embodiments of the present invention are described above. Those skilled in the art will recognize that many embodiments are possible within the scope of the invention. Other variations, modifications, and combinations of the various components and methods described herein can certainly be made and still fall within the scope of the invention. Thus, the invention is limited only by the following claims and equivalents thereto.

What is claimed is:

1. A wet well apparatus, comprising:
   a cylindrical body extending between a first end and a second end along a body axis defining an interior material holding volume, wherein the cylindrical body at the first end thereof lies a first distance from the body axis; and
   a base form closing the first end of the cylindrical body to define a base interior volume adjacent the interior material holding volume of the cylindrical body, wherein the base form is configured to receive a flowable fill material in the base interior volume, wherein the base foam comprises a base bottom and one or more base side walls extending from the base bottom, wherein the base bottom occupies an area greater than a cross-section area of the first end of the cylindrical body taken orthogonal to the body axis, and further wherein at least one or more portions of the one or more base side walls of the base form are located a distance farther from the body axis than the first distance.

2. The wet well apparatus of claim 1, wherein the base bottom is planar, and further wherein the base faun comprises one or more upper surface portions extending inward toward the cylindrical body from the one or more base side walls.

3. The wet well apparatus of claim 2, wherein the one or more base side walls are orthogonal to the base bottom, and further wherein the one or more upper surface portions extending inward toward the cylindrical body from the one or more base side walls are parallel to the base bottom.

4. The wet well apparatus of claim 1, wherein the base form further comprises:
   reinforcement material positioned in the base interior volume;
      one or more layers of material located at the first end of the cylindrical body between the base interior volume and the interior material holding volume of the cylindrical body; and
      one or more fill openings defined in at least one of the one or more layers of material located at the first end of the cylindrical body between the base interior volume and the interior material holding volume of the cylindrical body.

5. The wet well apparatus of claim 4, wherein all the one or more fill openings are defined in the one or more layers of material located at the first end of the cylindrical body.

6. The wet well apparatus of claim 1, wherein the base form has a rectangular cross-section orthogonal to the body axis.

7. The wet well apparatus of claim 1, wherein the base faun has a circular cross-section orthogonal to the body axis.

8. The wet well apparatus of claim 1, wherein the cylindrical body and base form are formed of fiberglass reinforced plastic.

9. The wet well apparatus of claim 1, wherein the base form forms a fluid-tight connection with the cylindrical body.

10. The wet well apparatus of claim 1, wherein the base form is filled with the flowable fill material.

11. The wet well apparatus of claim 10, filling the base form with the flowable fill material results in an upper surface portion of the fill material adjacent the interior material holding volume of the cylindrical body, and further wherein the upper surface portion of the fill material is covered with one or more layers of material secured at the first end of the cylindrical body.

12. A method of installing a wet well apparatus in a hole, the method comprising:
   positioning a wet well apparatus in the hole, wherein the wet well apparatus comprises:
      a cylindrical body extending between a first end and a second end along a body axis to define an interior material holding volume, and
      a base form closing the first end of the cylindrical body, wherein the base form defines a base interior volume adjacent the interior material holding volume defined by the cylindrical body; and
   providing a flowable fill material within the base interior volume defined by the base form.

13. The method of claim 12, wherein providing a flowable fill material within the base interior volume comprises providing a flowable fill material within the base interior volume while the wet well apparatus is in the hole.

14. The method of claim 12, wherein providing a flowable fill material within the base interior volume comprises filling concrete within the base interior volume.

15. The method of claim 12, wherein the cylindrical body of the wet well apparatus at the first end thereof is a first distance from the body axis, wherein the base form comprises a base bottom and one or more base side walls extending from the base bottom, wherein at least one or more portions of the one or more base side walls of the base form are located a distance farther from the body axis than the first distance.

16. The method of claim 12, wherein the wet well apparatus further comprises one or more layers of material located at the first end of the cylindrical body between the base interior volume and the interior material holding volume of the cylindrical body and one or more fill openings defined in the one or more layers of material located at the first end of the cylindrical body, and further wherein providing the flowable fill material within the base interior volume defined by the base form comprises providing flowable fill material within the base interior volume defined by the base form through one or more of the fill openings.

17. The method of claim 12, wherein the method further comprises positioning reinforcement material in the base interior volume defined by the base form.

18. The method of claim 12, wherein providing flowable fill material within the base interior volume results in an upper surface portion of the fill material adjacent the interior material holding volume defined by the cylindrical body, and further wherein the method comprises positioning one or more layers of material at the first end of the cylindrical body to cover the upper surface portion of the fill material.

19. The method of claim 12, wherein the second end is configured to provide access to the interior material holding volume defined by the cylindrical body, and further wherein providing the flowable fill material within the base interior volume comprises providing the flowable fill material within the base interior volume via the second end.

20. The method of claim 12, wherein the cylindrical body and base form are formed of fiberglass reinforced plastic.

21. The method of claim 12, wherein the base form forms a fluid-tight connection with the cylindrical body.

22. A wet well apparatus, comprising:
   a cylindrical body of fiberglass reinforced plastic extending between a first end and a second end along a body axis defining an interior material holding volume; and a base form of fiberglass reinforced plastic forming a fluid-tight connection with the cylindrical body and closing the first end of the cylindrical body to define a base interior volume adjacent the interior material holding volume of the cylindrical body, wherein the base form is configured to receive a flowable fill material in the base interior volume, wherein the base form comprises a base bottom and one or more base side walls extending from the base bottom, wherein the base bottom occupies an area greater than a cross-section area of the first end of the cylindrical body taken orthogonal to the body axis, and further wherein a cross-section area of at least another portion of the base form taken orthogonal to the body axis is greater than the cross-section area of the first end of the cylindrical body taken orthogonal to the body axis.

23. The wet well apparatus of claim 22, wherein the base bottom is planar, wherein the one or more base side walls are orthogonal to the base bottom, and further wherein the base form comprises one or more upper surface portions extending inward toward the cylindrical body from the one or more base side walls.

24. The wet well apparatus of claim 22, wherein the base form further comprises:
   one or more layers of material positioned at the first end of the cylindrical body between the base interior volume and the interior material holding volume of the cylindrical body; and
   one or more fill openings defined in the one or more layers of material positioned at the first end of the cylindrical body.

25. The wet well apparatus of claim 22, wherein the base form has a rectangular cross-section orthogonal to the body axis.

26. The wet well apparatus of claim 22, wherein the base form forms a fluid-tight connection with the cylindrical body.

27. The wet well apparatus of claim 22, wherein the base form is filled with the flowable fill material.

* * * * *

UNITED STATES PATENT AND TRADEMARK OFFICE
CERTIFICATE OF CORRECTION

PATENT NO. : 8,091,728 B2
APPLICATION NO. : 12/247525
DATED : January 10, 2012
INVENTOR(S) : John Burwell Page 1 of 1

It is certified that error appears in the above-identified patent and that said Letters Patent is hereby corrected as shown below:

Column 9 – Line 12
Delete "faun" and insert --form--

Column 10 – Line 52
Delete "faun" and insert --form--

Column 10 – Line 60
Delete "faun" and insert --form--

Column 13 – Claim 2.
Delete "faun" and insert --from--

Column 13 – Claim 7.
Delete "faun" and insert --from--

Signed and Sealed this
Thirteenth Day of March, 2012

David J. Kappos
*Director of the United States Patent and Trademark Office*

UNITED STATES PATENT AND TRADEMARK OFFICE
CERTIFICATE OF CORRECTION

PATENT NO.         : 8,091,728 B2                                          Page 1 of 1
APPLICATION NO.    : 12/247525
DATED              : January 10, 2012
INVENTOR(S)        : John Burwell It is certified that error appears in the above-identified patent and that said Letters Patent is hereby corrected as shown below:

Column 9 – Line 12
Delete "faun" and insert --form--

Column 10 – Line 52
Delete "faun" and insert --form--

Column 10 – Line 60
Delete "faun" and insert --form--

Column 13, line 30 (Claim 2, line 2)
Delete "faun" and insert --from--

Column 13, line 56 (Claim 7, line 1)
Delete "faun" and insert --from--

This certificate supersedes the Certificate of Correction issued March 13, 2012.

Signed and Sealed this
Third Day of April, 2012

David J. Kappos
*Director of the United States Patent and Trademark Office*

UNITED STATES PATENT AND TRADEMARK OFFICE
CERTIFICATE OF CORRECTION

PATENT NO.         : 8,091,728 B2                                    Page 1 of 1
APPLICATION NO.    : 12/247525
DATED              : January 10, 2012
INVENTOR(S)        : John Burwell It is certified that error appears in the above-identified patent and that said Letters Patent is hereby corrected as shown below:

Column 9 – Line 12
Delete "faun" and insert --form--

Column 10 – Line 52
Delete "faun" and insert --form--

Column 10 – Line 60
Delete "faun" and insert --form--

Column 13, line 30 (Claim 2, line 2)
Delete "faun" and insert --form--

Column 13, line 56 (Claim 7, line 1)
Delete "faun" and insert --form--

This certificate supersedes the Certificates of Correction issued March 13, 2012 and April 3, 2012.

Signed and Sealed this
Thirty-first Day of July, 2012

David J. Kappos
*Director of the United States Patent and Trademark Office*